United States Patent
Wang et al.

(10) Patent No.: US 10,537,838 B2
(45) Date of Patent: Jan. 21, 2020

(54) ANTIMICROBIAL COMPOSITE FILTERING MATERIAL AND METHOD FOR MAKING THE SAME

(71) Applicant: KX Technologies LLC, West Haven, CT (US)

(72) Inventors: Jinwen Wang, Milford, CT (US); Meedia Kareem, Bridgeport, CT (US); Rezan Kareem, Bridgeport, CT (US); William Li, Stamford, CT (US); Bruce E. Taylor, Cheshire, CT (US); Carol DeLandra, West Haven, CT (US); Frank A. Brigano, Northford, CT (US)

(73) Assignee: KX Technologies LLC, West Haven, CT (US)

( * ) Notice: Subject to any disclaimer, the term of this patent is extended or adjusted under 35 U.S.C. 154(b) by 115 days.

(21) Appl. No.: 15/847,134

(22) Filed: Dec. 19, 2017

(65) Prior Publication Data

US 2018/0169552 A1   Jun. 21, 2018

Related U.S. Application Data

(60) Provisional application No. 62/436,837, filed on Dec. 20, 2016.

(51) Int. Cl.

| | |
|---|---|
| *D21H 11/18* | (2006.01) |
| *D21H 17/63* | (2006.01) |
| *D21H 17/67* | (2006.01) |
| *D21H 17/37* | (2006.01) |
| *B01D 39/18* | (2006.01) |
| *C02F 1/50* | (2006.01) |
| *C02F 1/00* | (2006.01) |

(52) U.S. Cl.
CPC ............ *B01D 39/18* (2013.01); *C02F 1/50* (2013.01); *D21H 11/18* (2013.01); *D21H 17/37* (2013.01); *D21H 17/63* (2013.01); *D21H 17/67* (2013.01); *B01D 2239/0442* (2013.01); *B01D 2239/10* (2013.01); *C02F 1/001* (2013.01); *C02F 2303/04* (2013.01)

(58) Field of Classification Search
CPC ........ D21H 17/67; D21H 11/18; D21H 17/37; D21H 17/63; D21H 21/36; B01D 39/1623; B01D 39/18; B01D 2239/0442; B01D 2239/10; B01D 39/2017; B01D 2239/025; C02F 1/283; C02F 2303/04; C02F 1/50; C02F 1/001; C02F 2101/20; A61L 2/0017; A61L 2/0082; A61L 2/022; B01J 20/28028; B01J 20/28078
See application file for complete search history.

(56) References Cited

U.S. PATENT DOCUMENTS

| | | | |
|---|---|---|---|
| 5,443,735 A | 8/1995 | Kirnbauer et al. | |
| 6,261,679 B1 * | 7/2001 | Chen | A61F 13/53 264/45.2 |
| 6,562,192 B1 * | 5/2003 | Hamilton | A61F 13/15634 162/141 |
| 7,655,112 B2 * | 2/2010 | Koslow | A61L 2/0017 162/161 |
| 8,613,363 B2 * | 12/2013 | Koslow | A61L 2/0017 210/501 |
| 9,045,353 B2 | 6/2015 | Parekh | |
| 2003/0131962 A1 * | 7/2003 | Lindsay | D21H 21/18 162/168.2 |
| 2003/0220039 A1 * | 11/2003 | Chen | A61F 13/53 442/327 |
| 2004/0178142 A1 | 9/2004 | Koslow | |
| 2005/0268443 A1 * | 12/2005 | Ramkumar | A62D 5/00 28/107 |
| 2010/0044289 A1 * | 2/2010 | Koslow | A61L 2/0017 210/167.02 |
| 2012/0085695 A1 * | 4/2012 | Saxena | B82Y 30/00 210/491 |
| 2012/0325735 A1 * | 12/2012 | Dicks | C02F 1/002 210/289 |
| 2015/0258478 A1 | 9/2015 | Chatterjee | |
| 2016/0348035 A1 | 12/2016 | Berlin | |
| 2018/0169552 A1 * | 6/2018 | Wang | B01D 39/1623 |
| 2018/0339251 A1 * | 11/2018 | Li | B01D 39/1623 |

FOREIGN PATENT DOCUMENTS

| | | | | |
|---|---|---|---|---|
| FR | 2828114 A1 * | 2/2003 | ......... | B01D 39/1607 |
| WO | WO-2018119046 A1 * | 6/2018 | ......... | B01D 39/1623 |

* cited by examiner

*Primary Examiner* — Jose A Fortuna

(74) *Attorney, Agent, or Firm* — DeLio Peterson & Curcio LLC; Robert Curcio

(57) ABSTRACT

A filter media having lignite-derived activated carbon, polyacrylic acid (PAA), a commercially available copper-zinc alloy, and polydiallyldimethylammonium chloride (Poly-DADMAC) or Luviquat®, which is Poly[(3-methyl-1-vinylimidazolium chloride)-co-(1-vinylpyrrolidone)], combined and used as suitable replacement for TOG bituminous coal-based activated carbon, silver, and PolyDADMAC. Functional groups in lignite-based activated carbon interact with the polyacrylic acid. Functional groups such as calcium, iron, or aluminum oxide/hydroxide of lignite-based activated carbon interact with PAA, and help hold the PolyDADMAC in place. The additional presence of a copper-zinc alloy enhances the filter anti-microbiological performance.

13 Claims, 4 Drawing Sheets

Figure 1

| LGKDF0 | | | | LGKDF1 | | | | LGKDF2 | | | | LGKDF3 | | | |
|---|---|---|---|---|---|---|---|---|---|---|---|---|---|---|---|
| Current Gallons | Flow Rates mL/minutes @ 7" | MS-2 LRV | E. Coli LRV | Current Gallons | Flow Rates mL/minutes @ 7" | MS-2 LRV | E. Coli LRV | Current Gallons | Flow Rates mL/minutes @ 7" | MS-2 LRV | E. Coli LRV | Current Gallons | Flow Rates mL/minutes @ 7" | MS-2 LRV | E. Coli LRV |
| 0.10 | 75 | 5.70 | 5.33 | 0.10 | 54 | 6.70 | 7.95 | 0.10 | 50 | 6.70 | 7.95 | 0.10 | 19 | <1 | 3.34 |
| 1.00 | 65 | 5.30 | 8.00 | 1.00 | 38 | 6.08 | 7.78 | 1.00 | 37 | 6.08 | 7.78 | | | | |
| 2.00 | 44 | 6.00 | 7.90 | 2.00 | 46 | 6.23 | 7.60 | 2.00 | 39 | 6.23 | 7.60 | | | | |
| 3.00 | 47 | 5.11 | 7.60 | 3.00 | 40 | 6.08 | 7.95 | 3.00 | 26 | 6.08 | 7.95 | | | | |
| 4.00 | 52 | 5.30 | 7.78 | 4.00 | 22 | 6.56 | 7.60 | 4.00 | 31 | 6.56 | 7.60 | | | | |
| 5.00 | 50 | 5.70 | 7.90 | 5.00 | 33 | 6.66 | 7.57 | 5.00 | 20 | 6.66 | 7.57 | | | | |
| 6.00 | 58 | 5.70 | 7.70 | 6.00 | 35 | 6.98 | 7.70 | 6.00 | 20 | 6.98 | 7.70 | | | | |
| 7.00 | 48 | 6.52 | 7.95 | 7.00 | 24 | 6.60 | 7.90 | 7.00 | 13 | 6.60 | 7.90 | | | | |
| 8.00 | 38 | 6.30 | 7.95 | 8.00 | 21 | 6.90 | 7.60 | 8.00 | 10 | 6.90 | 7.60 | | | | |
| 9.00 | 31 | 5.60 | 4.90 | 9.00 | 12 | 6.74 | 7.70 | 9.00 | 7 | 6.74 | 7.70 | | | | |
| | | | | 10.00 | 19 | 7.02 | 7.30 | | | | | | | | |
| | | | | 11.00 | 7 | 6.36 | 7.59 | | | | | | | | |

Figure 2

| A1A3 | | | | R276-9 | | | | R276-12 | | | |
|---|---|---|---|---|---|---|---|---|---|---|---|
| Current Gallons | Flow Rates mL/minutes @ 7" | MS-2 LRV | E. Coli LRV | Current Gallons | Flow Rates mL/minutes @ 7" | MS-2 LRV | E.coli LRV | Current Gallons | Flow Rates mL/minutes @ 7" | MS-2 LRV | E.coli LRV |
| 0.10 | 34 | 6.38 | 7.78 | 0.10 | 83 | 6.00 | 7.70 | | | | |
| 1.00 | 33 | 6.08 | 7.70 | 1.00 | 69 | 5.70 | 7.60 | 0.10 | 51 | 6.00 | 7.70 |
| 2.00 | 31 | 6.30 | 7.70 | 2.00 | 65 | 5.66 | 7.64 | 1.00 | 41 | 5.70 | 7.60 |
| 3.00 | 29 | 6.41 | 7.78 | 3.00 | 47 | 5.60 | 7.60 | 2.00 | 37 | 5.66 | 7.64 |
| 4.00 | 22 | 6.08 | 7.60 | 4.00 | 54 | 5.94 | 7.85 | 3.00 | | | - |
| 5.00 | 22 | 6.56 | 7.48 | 5.00 | 74 | 5.40 | 7.30 | 4.00 | 35 | 5.60 | 7.60 |
| 6.00 | 22 | 6.00 | 7.60 | 6.00 | 68 | 6.00 | 7.60 | 5.00 | 32 | 5.94 | 7.85 |
| 7.00 | 22 | 6.11 | 7.48 | 7.00 | 47 | 6.70 | 7.70 | 6.00 | 42 | 5.40 | 7.30 |
| 8.00 | 23 | 6.08 | 7.57 | 8.00 | 52 | 6.41 | 7.60 | 7.00 | 38 | 6.00 | 7.60 |
| 9.00 | 15 | 6.26 | 7.70 | 9.00 | 40 | 6.59 | 7.30 | 8.00 | 32 | 6.70 | 7.70 |
| 10.00 | 15 | 6.18 | 7.70 | 10.00 | 49 | 6.60 | 5.58 | 9.00 | 27 | 6.41 | 7.60 |
| 11.00 | 19 | 6.20 | 7.70 | 11.00 | 24 | 6.72 | 7.93 | 10.00 | 22 | 6.59 | 7.30 |
| 12.00 | 17 | 6.23 | 7.48 | 12.00 | 12 | 6.64 | 7.30 | 11.00 | 17 | 6.60 | 7.88 |
| 13.00 | 19 | 6.08 | 7.60 | 13.00 | 10 | 6.34 | 7.60 | 12.00 | 6 | 6.72 | 7.93 |
| 14.00 | 16 | 6.00 | 7.60 | | | | | | | | |

| 2L KDFCNC57 | | | |
|---|---|---|---|
| Current Gallons | Flow Rates mL/minutes @ 7" | MS-2 LRV | E.Coli LRV |
| 0.10 | 84 | 6.00 | 7.78 |
| 1.00 | 67 | 5.75 | 7.64 |
| 2.00 | 62 | 6.41 | 7.60 |
| 3.00 | 58 | 5.90 | 7.70 |
| 4.00 | 64 | 6.15 | 7.95 |
| 5.00 | 59 | 6.18 | 8.08 |
| 6.00 | 50 | 6.26 | 7.85 |
| 7.00 | 46 | 6.08 | 7.70 |
| 8.00 | 37 | 5.90 | 7.70 |
| 9.00 | 50 | 6.70 | 5.65 |
| 10.00 | 35 | 6.08 | 7.78 |

| Filtrex Nitric Acid Treated AC | | | |
|---|---|---|---|
| Current Gallons | Flow Rates mL/minutes @ 7" | MS2 LRV | E. Coli LRV |
| 0.10 | 100 | 5.85 | 7.86 |
| 1.00 | 120 | 5.51 | 7.85 |
| 2.00 | 93 | 6.00 | 7.67 |
| 3.00 | 102 | 5.18 | 7.78 |
| 4.00 | 27 | 6.26 | 7.97 |
| 5.00 | 60 | N/A | 3.21 |
| 6.00 | 49 | 5.73 | 3.48 |

ANTIMICROBIAL COMPOSITE FILTERING MATERIAL AND METHOD FOR MAKING THE SAME

BACKGROUND OF THE INVENTION

1. Field of the Invention

The invention relates generally to antimicrobial filters, and primarily to microporous fluid-permeable, treated fibrous materials, and to a process for preparing such materials for use in water filtration and purification.

2. Description of Related Art

Purification or filtration of water is necessary for many applications, including the provision of safe or potable drinking water. Water may contain many different kinds of contaminants including, for example, particulates, harmful chemicals, and microbiological organisms, such as bacteria, parasites, protozoa, and viruses. In a variety of circumstances, these contaminants must be removed before the water can be used.

There are many well-known methods currently used for water purification, such as distillation, ion-exchange, chemical adsorption, filtering, or retention, which is the physical occlusion of particulates. Particle filtration may be completed through the use of membranes or layers of granular materials, wherein such filtration is generally dictated by pore size.

Prior art filtration systems often attempt to achieve broad microbiological interception using filter media with small pore sizes.

Typically, microbiological interception enhancing agents are comprised of a water-soluble cationic material having a counter ion associated therewith at specific sites on the cationic material, in combination with a biologically active metal salt, such as silver, wherein the counter ion associated with the cationic material preferentially precipitates with at least a portion of the cation of the biologically active metal salt, and precipitation of the biologically active metal cation and the counter ion associated with the cationic material occurs in proximity to the cationic material.

The microbiological treatment is generally performed by coating activated carbon filter particles with a cationic polymer and silver or a silver containing material. Silver prevents bacteria and algae from building up in filters so that filters can do their job to rid drinking water of bacteria, chlorine, trihalomethanes, lead, particulates, and odor. Furthermore, silver, in concert with oxygen, acts as a powerful sanitizer that offers an alternative or an augmentation to other disinfectant systems.

Current filter paper media for microbiological reduction generally use and prefer silver treated carbon. However, this is a costly process, and regulation on this type of use for silver is tightening in the industry. Silver is regulated by US Environmental Protection Agency (EPA) National Secondary Drinking Water Regulations. Some scientists and environmental watchdog groups have cautioned that putting nanosilver to widespread use may pose risks, and it remains unknown how the effects of chronic exposure to the particles may affect human health or the ecosystem in the long run. Thus, there remains a need to find alternative antimicrobial materials that are safe for use and have efficacy at least on the order of filter media that currently employ silver.

Additionally, public demand for sufficient flow rate of existing paper filter media is increasing. Filter paper treated for microbiological interception is generally used in gravity-fed applications, where flow rate may be comprised. The need for antimicrobial filter paper that can employ a silver-substitute microbiological interception agent, and exhibit enhanced flow rate properties remains a desired attribute for water filtration media.

SUMMARY OF THE INVENTION

Bearing in mind the problems and deficiencies of the prior art, it is therefore an object of the present invention to provide a lower cost antimicrobial material for water filtration applications that may be used as an alternative to silver.

It is another object of the present invention to provide a lower cost antimicrobial material for water filtration applications without using silver that has an increased flow rate over silver-based filter media.

It is yet another object of the present invention to provide a filter media that may be formulated from thinner paper, and thus less filter media overall, but retains microbiological interception on the order of current filter media that utilizes silver as an antimicrobial.

The above and other objects, which will be apparent to those skilled in the art, are achieved in the present invention which is directed to a process for the production of a filter media for fluid filtration having antimicrobial properties comprising the steps of: a) diluting polyacrylic acid in deionized water to form a diluted solution; b) adding lignite-based powdered activated carbon to the diluted solution and blending to form a blended solution; c) soaking the blended solution; d) mixing a copper-zinc alloy with a wet cellulose fibrillated fiber, a heavy metal removal powder adsorbent, and a CoPET/PET polyester fiber, with the blended solution to form a resultant solution; e) blending the resultant solution; f) forming a paper slurry from the resultant solution; and g) drying the paper slurry to form the filter media.

The polyacrylic acid is diluted in deionized water at an approximate ratio of 0.5 g-11 g PAA to 1 L of deionized water.

The lignite-based powdered activated carbon is added to the diluted solution at a ratio of approximately 0.5 g to 8 g lignite-based powdered activated carbon to about 1 L of diluted solution.

The lignite-based powdered activated carbon is blended with the diluted solution for approximately 3 minutes.

The process of claim 1 wherein the copper-zinc alloy is added to the blended solution at a ratio of 0.5 to 2 g of the copper-zinc alloy per 1 square foot of fabricated filter paper.

The wet cellulose fibrillated fiber is added to the combined solution at an approximate ratio of 14 g to 60 g wet cellulose fibrillated fiber per 1 square foot of fabricated filter paper.

The wet cellulose fibrillated fiber may be treated with a first flocculating agent.

The heavy metal removal powder (HMRP) adsorbent is combined with the blended solution at an approximate ratio of 0.6 g HMRP per 1 square foot of fabricated filter paper.

The process may further include adding a second flocculating agent, and the second flocculating agent may be added in a ratio of approximately 0.4 g-20 g of the second flocculating agent per 1 square foot of fabricated filter paper.

The process includes adding CoPET/PET polyester fiber at a ratio of approximately 1 g of the CoPET/PET polyester fiber per 1 square foot of fabricated filter paper.

In a second aspect, the present invention is directed to a process for the production of a filter media for fluid filtration having antimicrobial properties comprising the steps of: a)

adding lignite-based powdered activated carbon to one liter of deionized water and blending to form a blended solution; b) soaking the blended solution; c) mixing a copper-zinc alloy with a wet cellulose fibrillated fiber, a heavy metal removal powder adsorbent, and a CoPET/PET polyester fiber, with the blended solution to form a resultant solution; d) blending the resultant solution; e) forming a paper slurry from the resultant solution; and f) drying the paper slurry to form the filter media.

The wet cellulose fibrillated fiber is then treated with a first flocculating agent, wherein the first flocculating agent is PolyDADMAC or Poly[(3-methyl-1-vinylimidazolium chloride)-co-(1-vinylpyrrolidone)].

In a third aspect, the present invention is directed to a process for the production of a filter media for fluid filtration having antimicrobial properties comprising the steps of: a) diluting cellulose nanocrystals in deionized water to form a diluted solution; b) adding lignite-based powdered activated carbon or carbon having high meso/macropores and functional negatively charged surface groups to the diluted solution and blending to form a blended solution; c) soaking the blended solution; d) mixing a copper-zinc alloy with a wet cellulose fibrillated fiber, a heavy metal removal powder adsorbent, and a CoPET/PET polyester fiber, with the blended solution to form a resultant solution; e) blending the resultant solution; f) forming a paper slurry from the resultant solution; and g) drying the paper slurry to form the filter media.

In a fourth aspect, the present invention is directed to an antimicrobial filter paper comprising: diluted polyacrylic acid or other negatively charged materials; a lignite-based powdered activated carbon or other materials with high ratio meso/macropores and negatively charged surface chemistry; a copper-zinc alloy; a wet cellulose fibrillated fiber; a first flocculating agent; a heavy metal removal powder adsorbent, and a binder, such as a CoPET/PET polyester fiber.

In a fifth aspect, the present invention is directed to a filter media for fluid filtration having antimicrobial properties comprising: a polyacrylic acid; a lignite-based powdered activated carbon; a copper-zinc alloy with a wet cellulose fibrillated fiber; a heavy metal removal powder adsorbent; and a binder material.

In a sixth aspect, the present invention is directed to a filter media for fluid filtration having antimicrobial properties comprising: cellulose nanocrystals; lignite-based powdered activated carbon or carbon having high meso/macropores and functional negatively charged surface groups; a copper-zinc alloy with a wet cellulose fibrillated fiber; a heavy metal removal powder adsorbent; and a binder material, wherein the binder material includes a CoPET/PET polyester fiber.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 depicts a table of the performance of the filter media papers made to the specifications of process of the preferred embodiment of the present invention for different test Solutions #1, 2, and 3;

FIG. 2 depicts a table delineating the results of the pilot production run for samples produced from the process of an embodiment of the present invention;

DESCRIPTION OF THE PREFERRED EMBODIMENT(S)

Figures 3, 4:
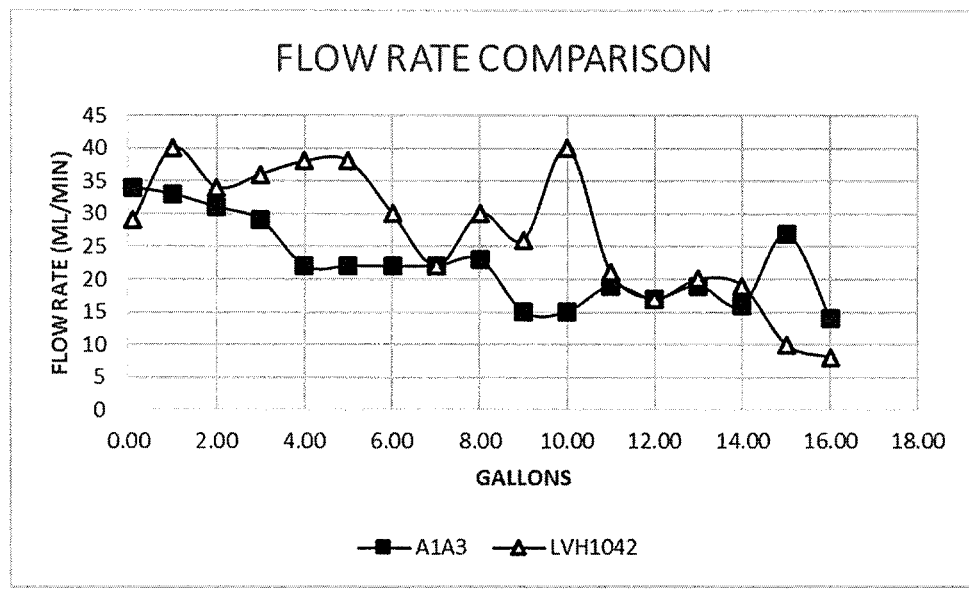
FIG. 3 depicts a graphical representation comparing the flow rate between the benchmark (A1A3) sample and the sample with Luviquat® (LVH1042) in lieu of POLYDAD-MAC.
FIG. 4 depicts the microbiological performance of the filter media when PAA is substituted with cellulose nanocrystals (CNC)

In describing the preferred embodiment of the present invention, reference will be made herein to FIGS. 1-6 of the drawings in which like numerals refer to like features of the invention.

In the present invention, the synergy of lignite-derived activated carbon, polyacrylic acid (PAA), a commercially available copper-zinc alloy (such as KDF® of KDF Fluid Treatment, Inc., of Three Rivers, Mich.), and polydially-ldimethylammonium chloride (PolyDADMAC) or a quaternized copolymer such as Luviquat® of BASF SE, which is Poly[(3-methyl-1-vinylimidazolium chloride)-co-(1-vinylpyrrolidone)], may be used to replace the current combination of TOG bituminous coal-based activated carbon, silver, and PolyDADMAC. In this manner, the need for silver is eliminated from the filter media, but the microbiological interception is retained.

A copper-zinc alloy process media is used in place of, or in conjunction with, granular activated carbon filters, carbon block, or inline filters. It can be used to replace silver-impregnated systems. This is preferred since silver is toxic and must be registered with the EPA as a toxic pesticide, whereas a copper-zinc alloy process media is not toxic, and need not be registered. Silver is also more expensive, so there remains a cost benefit for using copper-zinc alloy.

The preferred embodiment of the present invention represents a new formulation for an antimicrobial filter paper media, which allows for thinner layers, and thus less media. This enhances flow rate while lowering the cost of the final article. This novel formulation is capable of reaching or exceeding the microbiological interception capabilities of previous prior art formulations.

Essentially, a preferred embodiment of the present invention employs and utilizes the functional groups in lignite-based activated carbon to interact with the polyacrylic acid. Functional groups such as calcium, iron, or aluminum oxide/hydroxide of lignite-based activated carbon interact with PAA, and help hold the PolyDADMAC in place. Second, the carbon also has larger pores, e.g., more mesopore/macropores, and more acidic groups, e.g., carboxylic acidic groups, which will help to hold the PolyDADMAC.

The additional presence of a copper-zinc alloy, such as for example KDF®, has been found to enhance the filter antimicrobiological performance without having to employ silver as the antimicrobial material. The copper or zinc will also interact with the poly (1-vinylpyrrolidone) segments in Luviquat® to further anchor the positively charged polymer.

The preparation of filter paper that does not employ silver as the antimicrobial material is described below. Three different solutions from which filter paper was manufactured were generated and tested to determine the preferred embodiment of the present invention.

In three of four solutions, polyacrylic acid is diluted in one (1) liter of deionized water. The PAA may be, for example, Acumer® 1510 from Dow Chemical at 25% weight, or other equivalent. Each solution (Solutions #1, #2, & #3) contains a different amount of PAA diluted. Solution #0 has no PAA; Solution #1 has approximately 0.5 g of PAA diluted; Solution #2 has approximately 2.0 g of PAA diluted; and Solution #3 has approximately 11.0 g of PAA diluted.

Next, approximately 8.1 g of lignite-based powdered activated carbon, such as Hydrodarco® B from Cabot Corporation of Alpharetta, Ga., or other equivalent, is added to the above solutions and blended for about three (3) minutes. Hydrodarco® B is a lignite-based powdered activated carbon produced by steam activation of lignite coal, preferably finely milled to obtain a high degree of suspension with a high capacity for adsorption of organics that would otherwise cause taste and odor problems in drinking water supplies. The three blended solutions are then soaked overnight.

Next, a copper-zinc alloy is added. Preferably, approximately 2 g of a copper-zinc alloy, such as KDF-55F extra fine (−325 mesh) from KDF Fluid Treatment, or equivalent, is added. The copper-zinc alloy acts in replacement of silver as the antimicrobial in the filter paper.

Next, approximately 0.63 g of an adsorbent such as a heavy metal removal powder (HMRP) is added to each solution. A preferred HMRP is Metsorb® HMRP of Graver Technologies, LLC, of Glasgow, Del. MetSorb® HMRP adsorbent is a free-flowing powder designed for incorporation into pressed or extruded carbon blocks. The addition of MetSorb® HMRP at relatively low levels to a carbon block design is very effective for the reduction of lead, and at higher HMRP usage levels effective for reduction of arsenic, to meet the requirements of NSF Standard 42. MetSorb® HMRP adsorbs not only cationic lead species, but also both forms of Arsenic: Arsenic III and Arsenic V, present as (neutral) arsenite and (anionic) arsenate respectively. HMRP will also reduce a wide range of other metal contaminants commonly present in drinking water or process water, and is effective in polishing low levels of metal contaminants from industrial waste streams.

The resultant solutions are then independently combined with the following:
a) Approximately 13.86 g of a treated, wet cellulose fibrillated fiber (CSFO). The treatment is preferably with flocculating agents. Flocculants are used in water treatment to improve the sedimentation or filterability of small particles. One such flocculant is Floquat® of S.N.F.S.A. of Saint-Etienne of France;
b) Approximately 1.26 g of a low melting CoPET/PET polyester fiber, such as, for example, N720 fibers of Engineered Fibers Technology of Shelton, Conn., or equivalent; and
c) Approximately 8.0 g, 8.0 g, 6.0 g, and 20.0 g to Solutions #0, 1, 2, and 3, respectively, of a second flocculating agent, preferably Floquat® FL4440 (40% weight) of S.N.F.S.A.

Each resultant solution is then blended for three (3) minutes.

A paper slurry of each solution is formed in a Deckle Box on spun-bound polyester, such as Reemay® of Fiberweb, LLC, of Wilmington, Del., or equivalent, and dried at about 250° F. for about thirty (30) minutes to obtain approximately 12"×12" paper sheets.

The resultant paper weight of each solution without the spun-bound polyester are on the order of about 10.92 g, 12.7 g, 14.6 g, and 18.0 g respectively.

FIG. 1 depicts a table of the performance of the papers made to the specifications of Solutions #0, 1, 2, and 3 above, having different PAA amounts and different amounts of the second flocculating agent, in a gravity flow environment, against different pathogens (MS-2 bacteriophage and $E.\ coli$). The log removal values (LRV) of the pathogens were compared. The log removal value is the logarithm of the ratio of pathogen concentration in the influent and effluent water of a treatment process. (An LRV of 1 is equivalent to about a 90% removal of a target pathogen, an LRV of 2 is equivalent to about a 99% removal, and an LRV of 3 is equivalent to about 99.9% removal.) In FIG. 1, the four solutions are designated by the following labels: Solution #0 is named LGKDF0, Solution #1 is named LGKDF1, Solution #2 is named LGKDF2, and Solution #3 is named LGKDF3.

To acquire the testing results depicted in FIG. 1, samples of two 3"×5" patches were cut from each of the different paper sheets of filter media formed from the three solutions developed by the process described above. The 3"×5" patches were then wrapped on a plastic cylindrical core of about three (3) inches in length, and properly glued using normal binding techniques known in the art to obtain three different two-layered filters. The cylindrical filters were then secured/sealed (preferably glued) onto openings at the bottom of 1 gallon capacity buckets. Each filter was challenged with a mixture of approximately $10^6$ cfu/ml (colony forming unit per milliliter) of $E.\ coli$ and $10^6$ cfu/ml of MS-2 bacteriophage, in one gallon of dechlorinated city water.

Gravity acted as the driving pressure in this test environment. The flow rates and pH of the influents and effluents were checked daily until the filter flow rate reduces to about zero, and the filters clogged. Samples from the influents and effluents were collected and cultured daily. The detailed antimicrobial experiments of $E.\ coli$ and MS-2 reduction of each gravity filter were performed, and the results summarized in the table of FIG. 1. As noted in FIG. 1, the filters having increased PAA clogged earlier. For the LGKDF0 sample, the filter had some failure on bacteria reduction though it exhibited a higher flow rate. For the LGKDF1 filter, the performance exceeded that of the other two filter samples.

The samples from Solutions #2 and 3 (LGKDF2 and LGKDF3) clogged sooner. The latter being unable to achieve sufficient flow at the onset. The log removal rate of LGKDF1 and LGKDF2 exceeded that of the LGKDF0 sample as shown for flow rates up to and including 9 mL/min. The log removal rate of LGKDF1 was on the order of LGKDF2 up to 9 mL/min; however, the added filtering material presented a lower flow rate for the filter media option.

A pilot production run of filter media utilizing the same formulation process above was also conducted. Two samples were generated having a paper weight of about 9 g and 12 g. These samples were designated R276-9 and R276-12, respectively. These samples were compared against a benchmark (A1A3). The flow rates of both samples were significantly better than A1A3 and the log removal rates were better or at least comparable in all instances.

The similar procedure is performed with the replacement of POLYDADMAC with Luviquat® polymer of BASF Corporation of Florham Park, N.J., made with a paper weight of approximately 13 g, and identified as test sample LVH1042. The comparison of flow rate between the benchmark A1A3 and the sample with Luviquat® (LVH1042) is depicted in FIG. 3. The Luviquat sample had significantly better flow rate.

It is noted that the flow rate of the test samples may be increased by reducing the thickness of paper without any appreciable degradation in antimicrobial performance.

FIG. 2 depicts a table delineating the results of the pilot production run for samples R276-9 and R276-12. R276-12 exhibited greater log removal values per current gallon influent; however, the flow rate was appreciably less than R276-9. That is, as one would expect, when the thickness of the paper is reduced, the flow rate increases. R276-9 achieved significant flow rate increases across the spectrum of current gallon influent over the prior art test sample A1A3 while maintaining or exceeding the prior art's log removal values for MS-2 and E. coli.

A similar procedure is performed with the replacement of PAA with cellulose nanocrystals (CNC) obtained as an 11.6% solution, made with a paper weight of approximately 12 g, and identified as test sample KDFCNC57. CNC are whiskers with a length of several hundred nanometers and a diameter of several nanometers. Their surface area is about hundreds square meters per gram. Due to their production process and their nature, the CNC has lots of negatively charged functional groups, such as carboxylic acidic groups and sulfonic acidic groups on their surface. Therefore, they can be used to substitute the PAA. Its MB performance is depicted in FIG. 4. The paper worked up to 10 gallons challenge with an excellent flow rate.

Figures 5, 6:
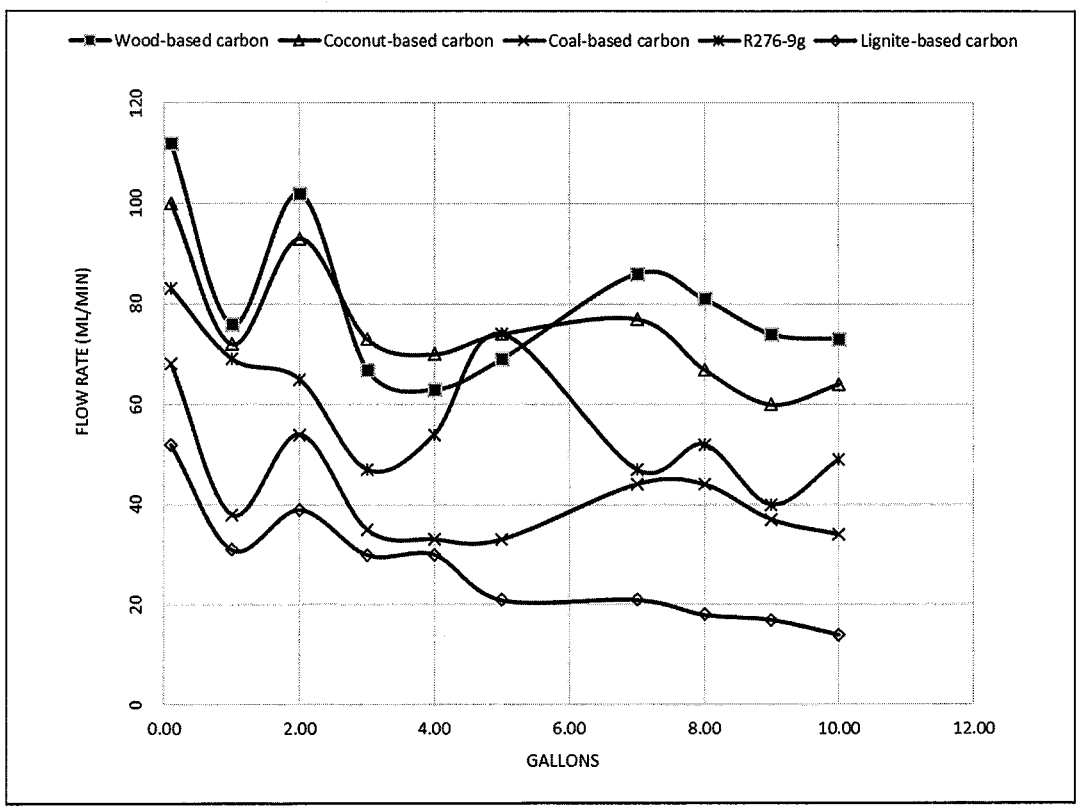
FIG. 5 depicts the microbiological performance of the filter media when PAA is substituted with lignite carbon with nitric acid treated coconut carbon.
FIG. 6 depicts the microbiological performance of filter media having lignite carbon replaced with coconut-based, wood-based, and coal-based carbon, made with a paper weight of approximately 13 g.

The similar procedure is performed with the replacement of lignite carbon with nitric acid treated coconut carbon, made with a paper weight of approximately 10 g, and identified as test sample KDF20. The microbiological performance is depicted in FIG. 5. The paper has a very high zeta potential, 23 mV at pH of 6.1.

Different types of carbon have different pores, surface chemistry, etc. The similar procedure is performed with the replacement of lignite carbon with coconut-based, wood-based and coal-based carbon, made with a paper weight of approximately 13 g, and identified as test samples coconut-based, wood-based and coal-based carbon. The microbiological performance is depicted in FIG. 6. The R276-9 g was a pilot run of the lignite-based carbon. For all non-lignite carbon, only 4 log bacteria reduction was observed, while greater than 4 log virus reduction was observed for all the data points in FIG. 6.

A filter cartridge having filter media formed from the above-identified process represents another embodiment of the present invention. The filter cartridge is generally fabricated for use in gravity-flow applications and includes an input or ingress port for receiving unfiltered fluid, and an output or egress port for exiting filtered fluid. The filter media is enclosed within a sump of the filter cartridge. The filter media within the filter cartridge may be pleated for increased surface area, which also minimizes the pressure drop across the filter media.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for the production of a filter media for fluid filtration having antimicrobial properties comprising the steps of:
   a) diluting polyacrylic acid in deionized water to form a diluted solution;
   b) adding lignite-based powdered activated carbon to said diluted solution and blending to form a blended solution;
   c) soaking said blended solution;
   d) mixing a copper-zinc alloy with a wet cellulose fibrillated fiber, a heavy metal removal powder adsorbent, and a CoPET/PET polyester fiber, with said blended solution to form a resultant solution;
   e) blending said resultant solution;
   f) forming a paper slurry from said resultant solution; and
   g) drying said paper slurry to form said filter media.

2. The process of claim 1 wherein said polyacrylic acid is diluted in deionized water at an approximate ratio of 0.5 g-11 g polyacrylic acid to 1 L of deionized water.

3. The process of claim 1 wherein said lignite-based powdered activated carbon is added to said diluted solution at a ratio of approximately 0.5 g to 8 g lignite-based powdered activated carbon to about 1 L of diluted solution.

4. The process of claim 1 wherein said lignite-based powdered activated carbon is blended with said diluted solution for approximately 3 minutes.

5. The process of claim 1 wherein said copper-zinc alloy is added to said blended solution at a ratio of 0.5 to 2 g of said copper-zinc alloy per 1 square foot of fabricated filter paper.

6. The process of claim 1 wherein said wet cellulose fibrillated fiber is added to said combined solution at an approximate ratio of 14 g to 60 g wet cellulose fibrillated fiber per 1 square foot of fabricated filter paper.

7. The process of claim 1 including treating said wet cellulose fibrillated fiber with a first flocculating agent.

8. The process of claim 7 wherein said first flocculating agent is added to said wet cellulose fibrillated fiber.

9. The process of claim 7 including adding a second flocculating agent.

10. The process of claim 9 wherein said second flocculating agent is added in a ratio of approximately 0.4 g-20 g of said second flocculating agent per 1 square foot of fabricated filter paper.

11. The process of claim 1 wherein said heavy metal removal powder (HMRP) adsorbent is combined with said blended solution at an approximate ratio of 0.6 g HMRP per 1 square foot of fabricated filter paper.

12. The process of claim 1 including forming said paper slurry on spun-bound polyester, and dried at about 250° F. for about thirty (30) minutes.

13. The process of claim 1 wherein said CoPET/PET polyester fiber is added at a ratio of approximately 1 g of said CoPET/PET polyester fiber per 1 square foot of fabricated filter paper.

\* \* \* \* \*